Aug. 14, 1923.
J. B. MULHOLLAND
1,464,579
AUTOMOBILE SIGNAL
Filed Sept. 27, 1922
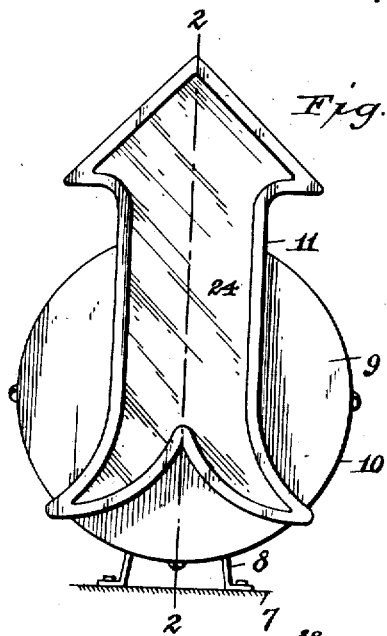
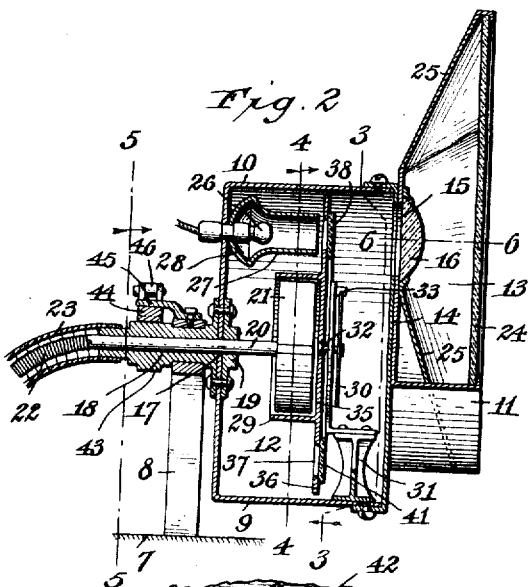
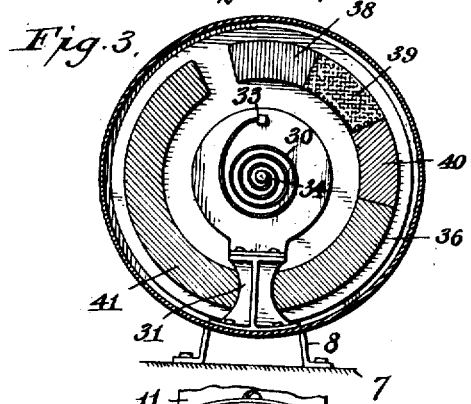
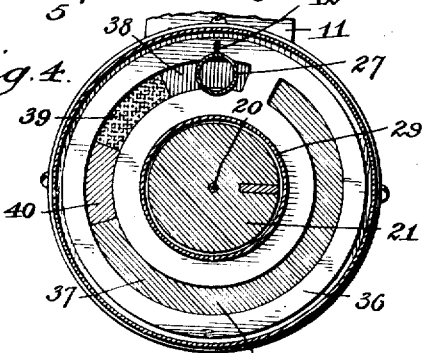
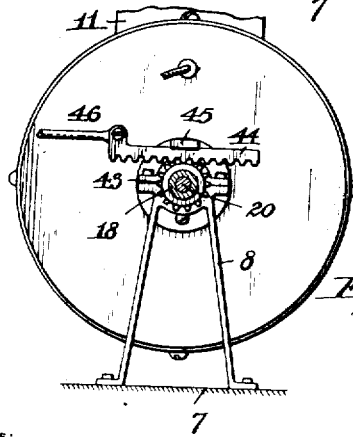
Witness:
J. J. Oberst.
Inventor:
John B. Mulholland,
By Emil Neubert
Attorney Patented Aug. 14, 1923.

1,464,579

UNITED STATES PATENT OFFICE.

JOHN B. MULHOLLAND, OF BUFFALO, NEW YORK.

AUTOMOBILE SIGNAL.

Application filed September 27, 1922. Serial No. 590,850.

*To all whom it may concern:*

Be it known that I, JOHN B. MULHOLLAND, a citizen of the United States, residing at Buffalo, in the county of Erie and State of New York, have invented certain new and useful Improvements in Automobile Signals, of which the following is a specification.

My invention relates to an automobile signal, such as are used to indicate intention to stop and turn.

The primary object of my invention is to produce a signal of this kind which will notify occupants of automobiles in rear of intention to stop, or to turn from a straight course, after displaying a caution signal.

Another object is to so construct the signal that occupants of automobiles in rear will be kept informed whether the automobile having the signal applied thereto is proceeding at reasonably fast speed, or is slackening speed, probably with intention to stop or make a turn.

A further object is to indicate approximately the speed of travel up to a predetermined speed and to indicate when the automobile is traveling beyond said predetermined speed.

A still further object is to display an arrow or other direction-indicating element under different colors so that those in rear can determine the approximate speed at which the change in direction is to be made, or is being made.

With the above and other objects in view to appear hereinafter, my invention consists in an automobile signal having a speed-controlled multi-color signaling element.

It also consists in the use of a multi-color signaling element used in conjunction with a direction indicating element.

It further consists in a direction-indicating element and means to automatically display said element under different colors to denote approximate speed of the automobile.

It still further consists in the novel features of construction, and in the arrangement and combination of devices and parts to be hereinafter described and more particularly pointed out in the subjoined claims.

In the drawings, forming part of this specification,—

Fig. 1 is a rear elevation of a signal embodying my invention.

Fig. 2 is a central longitudinal section of the same, taken on line 2—2, Fig. 1.

Fig. 3 is a transverse section taken on line 3—3, Fig. 2, looking in the direction of the arrow crossing said line.

Fig. 4 is a transverse section taken on line 4—4, Fig. 2, looking in the direction of the arrow crossing said line.

Fig. 5 is a transverse section of the device, taken on line 5—5, Fig. 2, looking in the direction of the arrow crossing said line.

Fig. 6 is a horizontal section taken on line 6—6, Fig. 2.

Having reference to the drawings in detail, the numeral 7 designates a portion of an automobile to which my device is secured by means of a support or bracket 8.

9 designates the casing of the device which, in the particular embodiment of my invention illustrated, comprises a cylindrical portion 10 and an indicating portion 11 in the form of an arrow. The interior of the casing may therefore be said to be divided into two compartments 12, 13, separated by a wall 14 having an opening 15 therein; but, if desired the casing may be constructed with a single compartment, which would in part form the interior of the cylindrical portion and in part the arrow-like portion. I, however, prefer the design and construction illustrated in the drawings for the reason that it permits the use of a lens 16, the purpose of which will be set forth hereinafter.

In the front wall of the casing, or more particularly, of the cylindrical portion 10 thereof, an opening 17 is provided and on the outer and inner sides of said wall, bearing members 18, 19 are riveted or otherwise fastened in which a shaft 20 is journaled for rotation. The two bearing members furnish an extended bearing for the shaft and serve to stiffen the front wall of the casing.

The shaft 20 extends into the casing and has a cylindrical or disk-like magnet element 21 secured thereto, similar to the magnet element of a speedometer, and its outer end terminates beyond the outer end of the bearing and has one end of a flexible shaft 22 secured thereto which has its other end operatively connected with a movable part, preferably rotatable part, of the automobile whose rotative speed or velocity is controlled according to the speed at which the automobile is traveling.

The flexible shaft 22 and the outer end of the shaft 20 are enclosed within a tube 23 in the usual manner of a speedometer, one end of said tube surrounding the outer end of the bearing.

The rear wall 24 of the arrow-like portion 11 of the casing is formed of frosted or other translucent glass, preferably white, and this casing portion has walls 25 converging from the edges of the translucent wall 24 to the opening 17 in the wall separating the two compartments of the casing, part of said converging walls serving as outer walls for the casing portion 11 and part as an interior reflector. In fact, all the converging walls 25 serve as reflectors and if desired may be polished or otherwise treated to furnish a good reflecting surface.

In the cylindrical portion 10 of the casing in line with the opening 17 in the dividing wall of said casing is an electric incandescent or other suitable lamp 26 which is located within a tube 27 having a reflector 28 at its front end, and this lamp is connected with a battery or other suitable source of electric current.

The reflector 28 has a curvature which will cause the rays of light from the lamp to be projected through the opening 15 in the dividing wall of the casing and against the lens 16 which has the quality of receiving the light rays from the lamp 26 and spreading them against the extended inner surface of the translucent rear wall of the arrow-like or indicating portion 11 of the casing; thus illuminating said wall with like intensity at all points. In fact, the light rays thus confined within the portion 11 of the casing will strike the converging walls 25 and by them be reflected against the translucent rear wall 24 so as to intensify the illumination.

Supported in the field of the magnet-element 21 and surrounding the same is an annulus 29 which is attached or influenced by the magnetism of said element but restrained from rotating in unison therewith by a convolute spring 30 which has one end secured to said annulus or a part connected therewith and its other end secured to a fixed point within the casing. For this purpose a suitable bracket 31 is secured within the casing in which the annulus is journaled for rotation, as at 32; one end of said spring being fastened to said bracket, as at 33, and its other end to the axle or axis of said annulus, as at 34.

In the embodiment of my invention illustrated, the annulus has one end closed, as at 35, and it is provided with an outstanding flange 36. In other words, the closed end 35 and the flange 36 serve as a disk, from which an annular flange extends forwardly to serve as an element to be influenced by the magnet-element 21.

When the magnet-element rotates, the tendency is to attract or influence the annulus 29 which is in the magnetic field of said element, and cause said annulus to rotate therewith, but this tendency is counteracted by the convolute spring 30. The counteracting effect of said spring is, however, gradually overcome as said magnet-element is increased in velocity and therefore the annulus and parts extending therefrom are caused to rotate slightly in degree as the velocity of the magnet-element increases; but when the velocity of said magnet-element is retarded, the convolute spring causes slight retrograde rotary movement of said annulus in proportion to the reduction in speed.

It is to be noted that the outstanding flange 36 of said annulus, or, as it may be referred to, the marginal portion of the disk, is positioned in a plane between the lamp 26 and the lens 16 and that this flange or disk has a parti-circular opening 37 therein which is covered with differently-colored translucent display elements 38, 39, 40, 41.

One end of the opening 37 may represent zero, or zero may be represented by a point or mark 42 in Fig. 4, and when the automobile is at rest the mark 42 will be in line with the lamp 26, this being the normal position of the parts. When the parts are in normal position, as shown in Figs. 2 and 3, the colored element 38, which is red, will be in line with the tube 27 and will have the rays of light from the lamp 26 projected therethrough, the red light rays thus created will strike the lens 16 and by the latter be directed against the white translucent arrow-shaped glass 24 which will appear from the rear as though colored red.

The red translucent element may extend along a region of a number of degrees; for example, a region representing speed from zero to five miles per hour. From the five mile point, the second display element 39 commences and extends along a certain number of degrees; say a region representing speed from five miles to ten miles per hour. Said second display element may be any desired color or shade other than red, but is represented in the drawing as yellow. From the ten mile point, the third display element 40 commences and extends along a certain number of degrees; say a region representing speed from ten miles to fifteen miles per hour. Said third display may be of any color or shade other than those of the two first display elements; but in the drawing I have represented it as purple. From the fifteen mile point the fourth display element 41 commences and extends along the remainder of the parti-circular opening, representing speed from fifteen miles up to the limit of the device, which may vary, as in ordinary speedometers. This fourth display element may also be of any color or shade other than the three previously-mentioned display elements, and I represented the same in the drawings as green.

Manifestly, when any one of the several colored display elements are brought into a position between the lamp 26 and lens 16, the arrow-like translucent direction indicating element will be colored accordingly, thus imparting information to those in rear, of the approximate speed at which the automobile is traveling. For example, if the arrow is in vertical position, as shown in Fig. 1, a course straight ahead is indicated, and the color of the arrow indicates the approximate speed up to a certain limit.

Regardless of the position of the arrow, if colored green it would, under the arrangement and lay-out explained, indicate that the automobile is traveling at a speed above fifteen miles per hour, but the speed might be fifteen miles or sixty miles. It nevertheless would indicate a progressive speed and no intention to retard speed to an extent requiring care on the part of those following.

When retarding to a speed below fifteen miles per hour, the arrow would become purple; thereby notifying those following of a reduction of speed necessitating a possible change in course or that conditions ahead demand slower progress for comfort or safety.

Should the speed of the automobile be diminished to cause the arrow to be colored yellow, it would demand caution on the part of those following and would probably indicate need of proceeding under extreme caution, or intention to stop or to change the direction of course.

In the event that the speed of the automobile is lessened to a still further degree, the arrow would be colored red, and those in rear would be apprised of intention to stop, or turn under very slow speed.

From the foregoing it will be apparent, that by reason of the arrow or direction-indicating element being displayed under different colors, those following the automobile can govern themselves according to the color system used.

Usually a turn is made when the automobile is traveling at a speed of less than ten miles per hour, and the display of a yellow or red arrow would usually precede the positioning of the arrow in the direction in which the turn is to be made, as will hereinafter appear.

While I have shown display elements of four different colors, it will be understood that, under the principle involved in this invention, two, three or more than four colors may be employed; also that each color may indicate a speed other than that herein defined for it.

In the embodiment of my invention herein shown and described, the arrow, which indicates direction of travel, is produced as the result of the peculiar construction of of the casing, but the outline or display of the arrow may be otherwise produced. In the drawing the bearing on the front wall of the casing has a pinion 43 secured thereon and this pinion is engaged by a gear-rack 44 guided for movement between said pinion and a guide arm 45 extending forwardly from the support or bracket. One end of the gear-rack has an actuating rod 46 pivotally connected thereto which leads to or has connection with parts leading to within convenient reach of the driver of the automobile, or to a part or parts of the automobile operated when steering the front traction wheels out of a straight-ahead course, as may be desired. Thus, in one case, when the driver intends to turn or change his direction of travel, he may notify those in rear by rotating the casing and consequently the arrow, and this may be done under any color. In the other case, the turning of the steering or front traction wheels will cause the casing to be rotated, and this does not demand the arrow be displayed under any particular color or colors. However, since all traffic laws penalize careless driving, change in direction will invariably be made at reduced speed; and in any event, regardless of the velocity a car may be traveling under, a slow or a quick stop will be indicated accordingly.

It will be clear from the preceding description that the casing 9 may rotate on the shaft of the magnet-element whether said shaft is at rest or rotating; also that said shaft may rotate at any speed while the casing is in normal position or being turned. Therefore, each is free to operate independent of the other.

From the foregoing it will be apparent that I provide a combined speed and direction-indicating device as a unitary structure whereby the approximate speed of the automobile having the device applied thereto will be disclosed to those following so that they can govern themselves accordingly, and in addition to disclosing the approximate speed, the direction in which the automobile is to be propelled is noted conjointly with the speed at which it is being propelled.

Having thus described my invention, what I claim is:—

1. An automobile signal having a plurality of colored elements, a direction changing element, operating mechanism for said colored elements adapted for connection with an operating part of an automobile controlled in its movement according to the speed of the automobile, and means for actuating said direction changing element regardless of the speed of the automobile.

2. An automobile signal comprising a casing having an arrow-like opening, a lamp in said casing, and a rotatable element in a plane between said opening and lamp having a plurality of differently-colored translucent regions adapted to be brought successively, in opposite directions, in line with said opening and lamp.

3. An automobile signal comprising a casing having two compartments divided by a wall, one of said compartments having a display opening in the form of an arrow closed by a translucent pane of glass, a lens in said wall, a lamp in the other compartment, a rotatable element in said last-mentioned compartment having a plurality of differently colored translucent regions, means to cause rotation of said rotatable element to cause the rays of light to be projected under different colors against said pane of glass, and means to rotate said casing independent of said rotatable element.

4. The combination with an automobile, of a rotatable casing on said automobile having one of its walls equipped with a white translucent arrow-shaped portion, means within said casing to project differently colored rays of light against said arrow-shaped portion, and means operatively connecting a part of said color projecting means with a rotatable part of said automobile to change the colors of said rays of light at predetermined speeds of said automobile.

5. An automobile signal comprising a casing, a shaft extending into said casing adapted to be rotated by a part of an automobile, a magnet on said shaft within said casing, a rotatable element surrounding said magnet, a spring to retain said element at the end of its movement in one direction, said rotatable element being rotated in the opposite direction by said magnet against the tension of said spring, and a plurality of differently colored display members rotatable with said rotatable element.

6. An automobile signal comprising a casing, a shaft extending into said casing adapted to be rotated by a part of an automobile, a magnet on said shaft within said casing, a rotatable element surrounding said magnet, a spring to retain said element at the end of its movement in one direction, said rotatable element being rotated in the opposite direction by said magnet against the tension of said spring, a color display element rotated in conformity to the rotation of said rotatable element and having a plurality of differently colored translucent regions thereon, and a lamp projecting its rays of light through the colored region moved in line therewith.

7. An automobile signal comprising a casing having a mechanism compartment and a second compartment in the form of an arrow outlined against the rear of said mechanism compartment, said second compartment having its rear wall formed of white translucent glass, color changing and light projecting means in said mechanism compartment whereby differently colored light rays are projected against said white translucent glass according to the speed of the automobile, and means for rotating said second compartment.

8. An automobile signal having a translucent arrow of extended area, means to project differently colored light rays against said arrow, a lens through which said light rays are passed to cause them to diverge against said translucent arrow, and means to change the position of said translucent arrow.

9. An automobile signal comprising color displaying mechanism, and a direction-indicating element, each operable independent of the other but embodied in a unitary structure.

10. An automobile comprising a casing having a direction-indicating element, and color displaying mechanism in said casing including a shaft entering said casing, said shaft and casing being independently rotatable.

In testimony whereof I affix my signature.
JOHN B. MULHOLLAND.